(12) United States Patent
Yamamoto et al.

(10) Patent No.: US 6,227,979 B1
(45) Date of Patent: *May 8, 2001

(54) CONSTANT VELOCITY UNIVERSAL JOINT

(75) Inventors: Takeo Yamamoto; Yukihiro Tanigawa; Yutaka Matsuno, all of Toyota; Hideki Sugiura, Aichi-ken, all of (JP)

(73) Assignees: Toyota Jidosha Kabushiki Kaisha, Toyota; Kabushiki Kaisha Toyota Chuo Kenkyusho, Aichi-gun, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/248,280

(22) Filed: Feb. 11, 1999

(30) Foreign Application Priority Data

Feb. 20, 1998 (JP) .................................................. 10-056004
May 15, 1998 (JP) .................................................. 10-133097

(51) Int. Cl.$^7$ ....................................................... F16D 3/16
(52) U.S. Cl. ........................................... 464/145; 464/144
(58) Field of Search ..................................... 464/144, 143, 464/145, 906

(56) References Cited

U.S. PATENT DOCUMENTS

| 3,176,477 | * | 4/1965 | Mazzioti | 464/144 |
|---|---|---|---|---|
| 3,899,898 | * | 8/1975 | Takahashi et al. | 464/144 |
| 3,908,400 | * | 9/1975 | Takahashi et al. | 464/144 |
| 4,165,794 | * | 8/1979 | Warner et al. | 180/65.1 |
| 4,573,947 | * | 3/1986 | Hazebrook et al. | 464/906 |
| 5,531,643 | | 7/1996 | Welschof . | |
| 5,567,022 | * | 10/1996 | Linkner | 303/87 |

FOREIGN PATENT DOCUMENTS

| 52-20625 | 6/1977 | (JP) . |
|---|---|---|
| 59-158717 | 10/1984 | (JP) . |
| 3-61722 | 3/1991 | (JP) . |
| 6-50351 | 2/1994 | (JP) . |
| 7-91458 | 4/1995 | (JP) . |

* cited by examiner

*Primary Examiner*—Lynne H. Browne
*Assistant Examiner*—Aaron M Dunwoody
(74) *Attorney, Agent, or Firm*—Oblon, Spivak, McClelland, Maier & Neustadt, P.C.

(57) ABSTRACT

A constant velocity universal joint comprising: an inner race having a plurality of inner grooves; an outer race having a plurality of outer grooves; a plurality of balls arranged individually in the plurality of inner grooves and in the plurality of outer grooves; and a retainer for retaining the plurality of balls. The center of curvature of the plurality of inner grooves and the center of curvature of the plurality of outer grooves are set on the both sides of a bisector. The plurality of inner grooves are formed helically in the inner race, and the plurality of outer grooves are formed helically in the outer race. The adjoining inner grooves are inclined in opposite directions, and the adjoining outer grooves are inclined in opposite directions.

13 Claims, 12 Drawing Sheets

CONSTANT VELOCITY UNIVERSAL JOINT

BACKGROUND OF THE INVENTION

1. Field of the Invention

The present invention relates to a constant velocity universal joint to be used as a component of a power transmission of a vehicle.

2. Related Art

Generally, the constant velocity universal joint to be arranged in the power transmission line of a vehicle is exemplified by the Birfield type, tri-port type, double-offset type, cross groove type and double Cardan type. Of these, especially the Birfield type constant velocity universal joint, as frequently employed on the wheel side of the front drive shaft of the vehicle, is equipped with an inner race and an outer race arranged on the outer side of the inner race. A plurality of inner grooves are formed in the outer circumference of the inner race, and a plurality of outer grooves are formed in the inner circumference of the outer race. Moreover, one inner groove and one outer groove makes a pair for retaining each ball.

In addition, a bisector is set at a position halving the angle which is made between the first axis of the inner race and the second axis of the outer race. Moreover, the center of curvature of the inner groove in a plane containing the first axis and the center of curvature of the outer groove in a plane containing the second axis are offset on the two sides of the bisector. Between the inner race and the outer race, still moreover, there is arranged an annular retainer. This retainer retains the individual balls.

With the drive shaft being mounted on the vehicle, moreover, the inner race is connected to the shaft on the differential side, and the outer race is connected to the wheel side. Here, the height of the connection portion of the shaft on the differential side and the height of the connection portion on the wheel side are made different. As a result, the first axis of the inner race and the second axis of the outer race intersect to set a joint angle.

According to the Birfield type constant velocity universal joint thus constructed, the torque, as outputted from the differential, is transmitted through the inner race, the balls and the outer race to the wheels so that the vehicle is run by the driving force of the wheels. During the transmission of the torque by the Birfield type constant velocity universal joint, each ball moves in a direction normal to the bisector while being retained by the retainer. Moreover, the center of each ball is retained in the bisector so that the constant speed rotations are kept between the inner race and the outer race.

In the Birfield type constant velocity universal joint, however, the curvature center of the plurality of inner grooves and the curvature center of the plurality of outer grooves are offset on the two sides of the bisector. As a result, at the torque transmitting time, two loads toward the center of the balls are established at the touch points between the inner and outer grooves and the balls.

Then, the ball is pushed by the resultant force of the two loads in a direction normal to the bisector so that the retainer is pushed onto the outer circumference of the inner race and the inner circumference of the outer race by that pushing force. As a result, the touch point between the retainer and the inner and outer races, the touch point between the retainer and the ball or the touch point between the ball and the inner and outer grooves cause frictions to generate heat and repeated loads to invite fatigue and separations. This causes various problems of the reduction in the durability or torque transmitting function of the Birfield type constant velocity universal joint or of an increase in vibrations or booming noises.

On the other hand, one example of the invention capable of suppressing the resultant force to act on the balls is disclosed in Japanese Patent Laid-Open No. 91458/1995 (JP-A-7-91458). Here is disclosed that an included angle that is, an angle, which is made between a segment from the touch point between the ball and the inner and outer grooves to the center of the balls and the bisector, is set at a small value. When this construction is adopted, the resultant force in the direction normal to the bisector is reduced to lighten the friction and the repeated load at the touch point between the retainer and the inner and outer races or at the touch point between the retainer and the ball.

In the disclosed invention, moreover, of the inner groove and the outer groove, the curvature center corresponding to the axial base end portion to abut against the ball entering the inside of the outer race is set at a position different from the curvature center in other portions. Specifically, the included angle corresponding to the base end portion is made larger than that corresponding to other portions. When the ball is brought into the inside of the outer race by the constant speed rotations of the inner race and the outer race, therefore, the ball lock is suppressed to suppress the heat generation more at the touch point.

According to the Birfield type constant velocity universal joint disclosed in the aforementioned Laid-Open, however, it is possible to suppress the resultant force in the direction normal to the bisector but not to reduce the load to act on the touch point between the ball and the inner and outer grooves. Thus, the load to occur at the touch point between each ball and the inner and outer groove has made it impossible to solve the problem that the heat generation, fatigue or separation is caused in the ball, the inner race or the outer race. It has also been impossible to solve the problem that vibrations and booming noises are raised during the torque transmission.

In the Birfield type constant velocity universal joint of the Laid-Open, moreover, the curvature center of the inner groove and the curvature center of the outer groove are offset on the two sides of the bisector. In other words, the touch point between the ball and the inner surface of the inner groove and the touch point between the ball and the inner surface of the outer groove are offset on one side of the bisector. As a result, at the torque transmitting time, two forces (or loads) act from the individual touch points to the center of the ball. Moreover, these two forces establish a resultant force in a direction normal to the bisector to push each ball.

Then, the pushing force of each ball is transmitted to the retainer so that the inner circumference of the retainer is pushed onto the outer circumference of the inner race whereas the outer circumference of the retainer is pushed onto the inner circumference of the outer race. This results in the heat generation at the touch portions between the retainer and the inner and outer races. As a result, fatigue wear or separations may occur at those touch portions to lower the durability and the torque transmitting function of the Birfield type constant velocity universal joint.

SUMMARY OF THE INVENTION

A major object of the invention is to provide a constant velocity universal joint capable of suppressing as much as possible the load to be established at the touch point between the ball and the inner and outer grooves.

Another object of the invention is to provide a constant velocity universal joint capable of holding the torque transmitting function and the durability no matter whether the inner race and the outer race might rotate forward or backward.

Still another object of the invention is to provide a constant velocity universal joint capable of suppressing as much as possible the force to act on the retainer from the ball and to push the retainer in a direction normal to the bisector.

According to one aspect of the invention, there is provided a constant velocity universal joint comprising: an inner race having a plurality of inner grooves formed in its outer circumference; an outer race arranged on the outer side of the inner race and having a plurality of outer grooves formed in its inner circumference; a plurality of balls arranged for each of pairs each composed of one of the inner grooves and one of the outer grooves; and an annular retainer arranged between the inner race and the outer race for retaining the balls. At least one portion of the plurality of inner grooves is formed helically in the outer circumference of the inner race. At least one portion of the plurality of outer grooves is formed helically in the inner circumference of the outer race. At least one pair of the adjoining inner grooves is constructed to extend midway between the mutual inner grooves and made symmetric with respect to the plane containing the first axis. At least one pair of the adjoining outer grooves is constructed to extend midway between the mutual outer grooves and made symmetric with respect to the plane containing the second axis.

During the rotations of the inner race and the outer race, therefore, there are suppressed the loads to act on the touch point between each ball and the inner groove and the touch point between each ball and the outer groove. As a result, the fatigues and separations of the touch portions are reduced to improve the durability and the torque transmitting function of the constant velocity universal joint. Moreover, the vibrations and the booming noises during the rotations of the inner race and the outer race are suppressed.

Even when constant velocity universal joints of one kind (or the identical structure) are individually mounted on the power transmission of the vehicle at portions of reversed rotations, they retain their durabilities and torque transmitting functions substantially at equal levels. It is, therefore, sufficient to mount the constant velocity universal joints of one kind on the individual mounting portions.

According to another aspect of the invention, there is provided a constant velocity universal joint comprising: an inner race having a plurality of inner grooves formed in its outer circumference; an outer race arranged on the outer side of the inner race and having a plurality of outer grooves formed in its inner circumference; a plurality of balls arranged for each of pairs each composed of one of the inner grooves and one of the outer grooves; and an annular retainer arranged between the inner race and the outer race for retaining the center of the balls in a bisector halving the angle which is made between a first axis of the inner race and a second axis of the outer race, the center of curvature of arcuate portions of the inner grooves in a plane containing the first axis and the center of curvature of arcuate portions of the outer grooves in a plane containing the second axis being provided on the two sides of the bisector, so that first touch points, at which the balls and the arcuate portions of the inner grooves abut, and second touch points, at which the balls and the arcuate portions of the outer grooves abut, are set at one of the bisector. At least one portion of the arcuate portions of the inner grooves is so helically inclined that the first touch points for transmitting a torque between the arcuate portions of the inner grooves and the balls may approach the bisector. At least one portion of the arcuate portions of the outer grooves is so helically inclined that the second touch points for transmitting a torque between the arcuate portions of the outer grooves and the balls may approach the bisector.

Thus, the vectors of the individual loads to act toward the center of the balls and the acute one of the angles made with the bisector are made as small as possible so that the resultant force of the two loads, i.e., the pushing force to push the retainer in a direction normal to the bisector is reduced. As a result, the heat generation at the touch portion between the retainer and the inner and outer races is suppressed to reduce the fatigues, wears or separations and to improve the durability and the torque transmitting function of the constant velocity universal joint.

The above and further objects and novel features of the invention will more fully appear from the following detailed description when the same is read with reference to the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Figure 1:
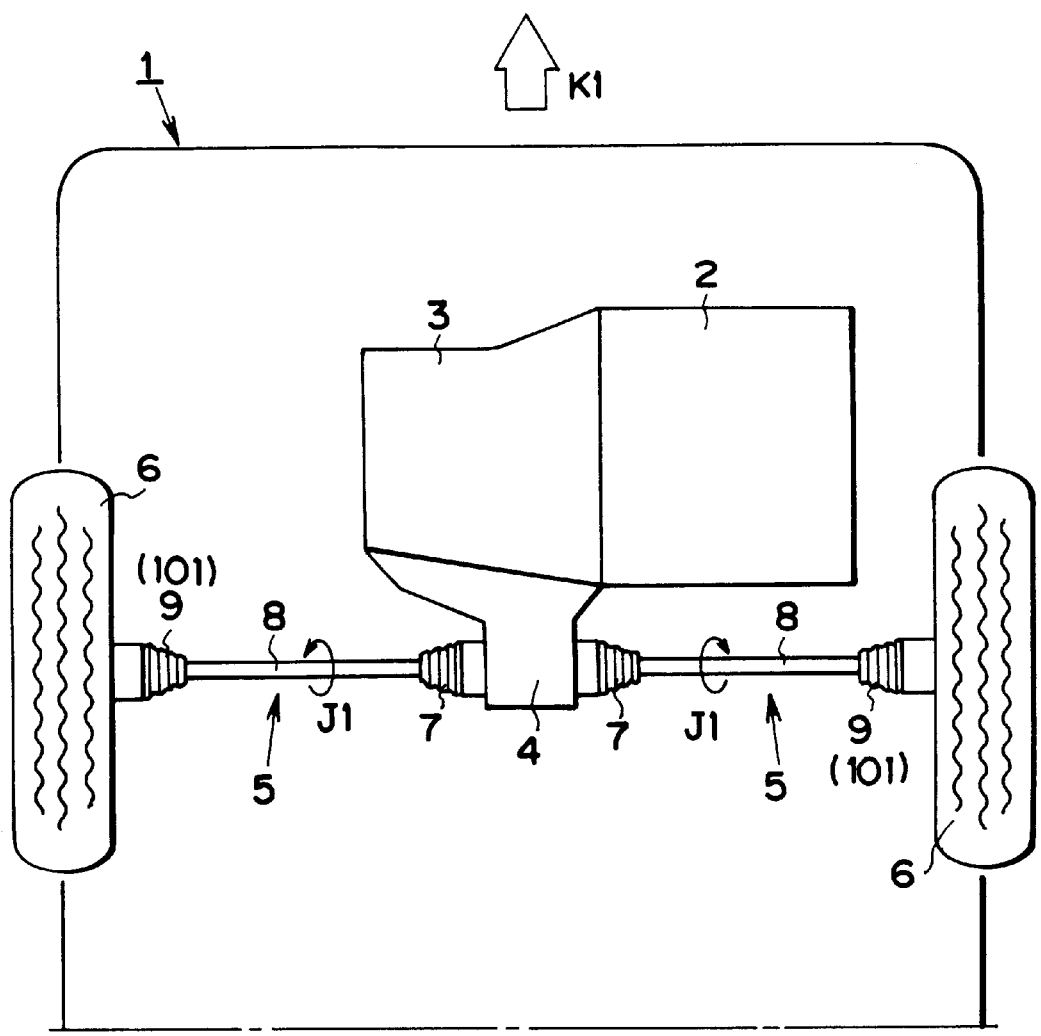
FIG. 1 is a schematic diagram showing a schematic construction of a vehicle to which the invention is applied.

A Birfield type constant velocity universal joint according to one embodiment of the invention will be described in detail with reference to the accompanying drawings. Here in the technical field of the constant velocity universal joint, the Birfield type constant velocity universal joint may be called as Rzeppa type constant velocity universal joint. FIG. 1 is a conceptional top plan view showing a vehicle 1 to which the invention is applied. On this vehicle 1, more specifically, there are mounted an engine 2 located in the front portion of the vehicle, a transmission 3 connected to the output side of the engine 2, and a differential 4 connected to the output side of the transmission 3.

To the output side of the differential 4, there are connected a pair of front drive shafts 5 which are connected to front wheels 6. These paired front drive shafts 5 are equipped with constant velocity universal joints 7 connected to the differential 4, shafts 8 connected to the constant velocity universal joints 7, and Birfield type constant velocity universal joints 9 connecting the shafts 8 and the front wheels 6. Thus, the vehicle 1 is the so-called "transverse engine" type vehicle in which the (not-shown) output shaft of the engine 2 is arranged transversely of the vehicle 1. Moreover, this vehicle 1 is the so-called "FF (front engine/front drive)" vehicle. Here, the constant velocity universal joint 7 is exemplified by a tri-port type or double offset type other than the Birfield type.

Figure 2:
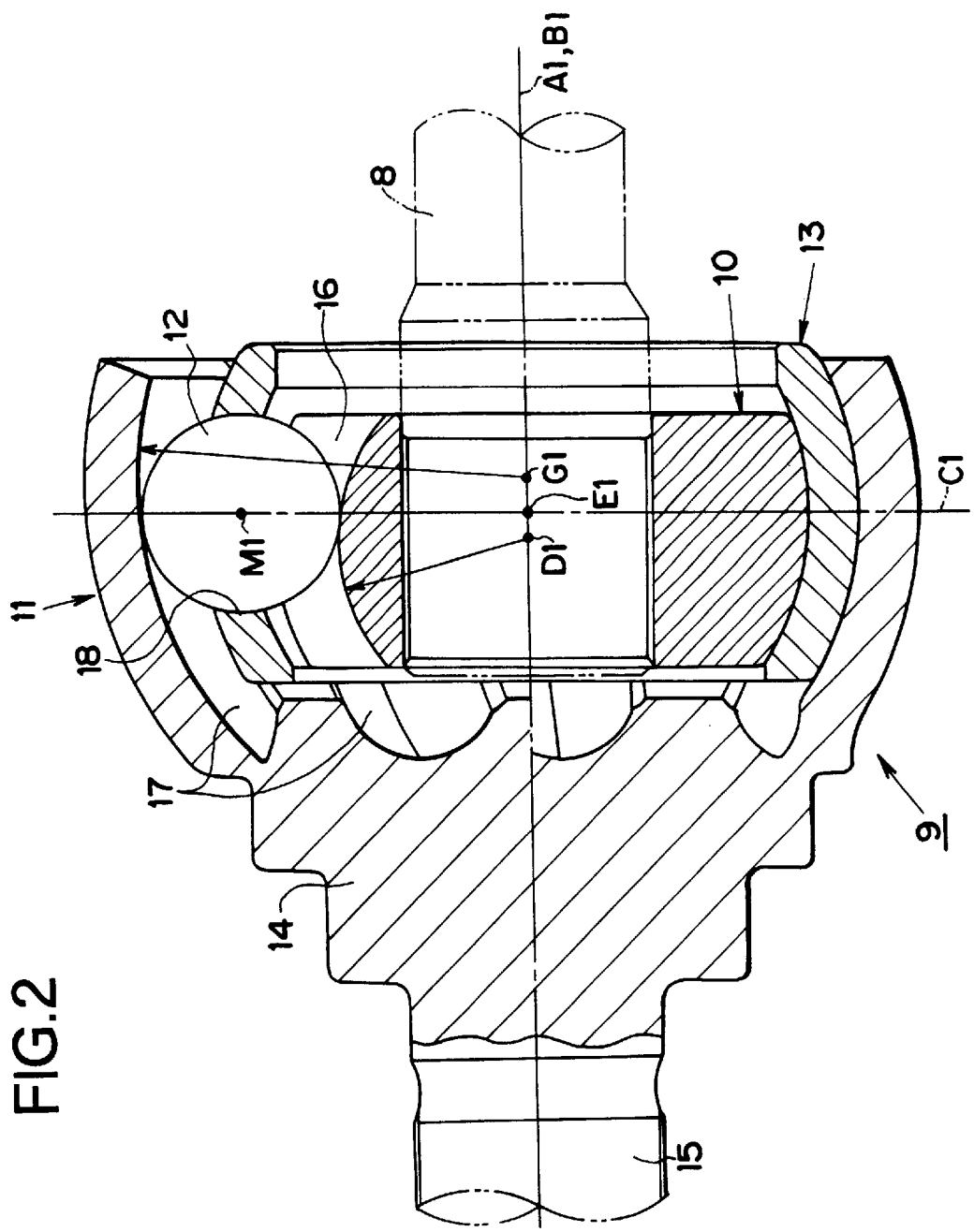
FIG. 2 is a section showing a Birfield type constant velocity universal joint according to an embodiment of the invention.

FIG. 2 is a section showing a construction of the Birfield type constant velocity universal joint 9 which is connected to the lefthand wheel 6 of FIG. 1. Here, the Birfield type constant velocity universal joint 9, as connected to the righthand wheel 6 of FIG. 1, will not be described because it is constructed symmetrically with the Birfield type constant velocity universal joint 9 shown in FIG. 2. This Birfield type constant velocity universal joint 9 in FIG. 2 is equipped with an inner race 10, an outer race 11, six balls 12 and an annular retainer 13. These parts will be specifically described on their constructions and their positional relations to other parts.

The inner race 10 is splined to one end side of the shaft 8 and is positioned in the longitudinal direction of the shaft 8 by the (not-shown) snap ring. With this construction, the inner race 10 can rotate on a first axis A1.

The outer race 11 is formed into a cylindrical shape and arranged outside of the inner race 10. At the end portion of the outer race 11, as opposed to the shaft 8, there is formed integrally with the outer race 11 a boss 14 which is equipped at its outer end with an axle 15. This axle 15 is connected to the wheel 6. With this construction, the outer race 11 can rotate on a second axis B1.

With the front drive shaft 5 being thus connected to the vehicle 1, the connection of the shaft 8 on the side of the differential 4 is made lower than the outer race 11 on the side of the wheel 6. Here in FIG. 2, the first axis A1 and the second axis B1 are so shown for conveniences as are generally aligned.

Figure 3:
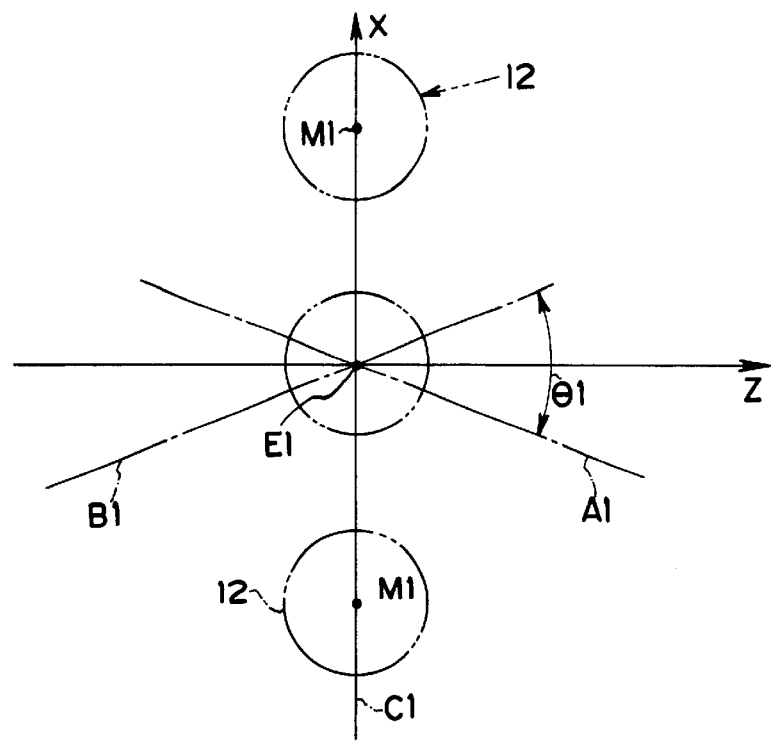
FIG. 3 is a coordinate system geometrically showing the Birfield type constant velocity universal joint shown in FIG. 2.
Figure 4:
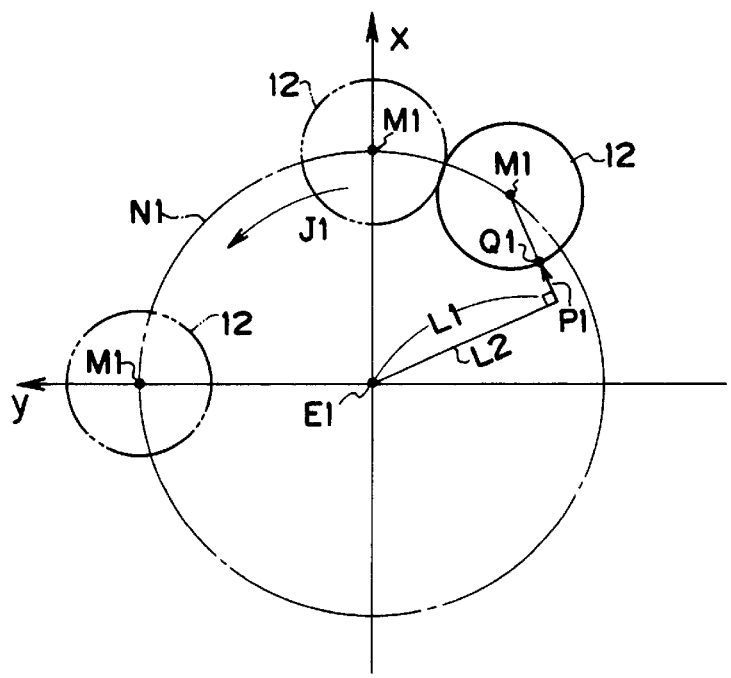
FIG. 4 is a coordinate system geometrically showing the Birfield type constant velocity universal joint shown in FIG. 2.

FIG. 3 is a coordinate system showing the positional relations among the first axis A1, the second axis B1 and the balls 12 two-dimensionally with the Birfield type constant velocity universal joint 9 being mounted on the vehicle 1. On the other hand, FIG. 4 is a two-dimensional coordinate system, as taken from the side of the lefthand wheel 6, of the coordinate system shown in FIG. 3.

With the Birfield type constant velocity universal joint 9 being mounted on the vehicle 1, as shown in FIG. 3, the first axis A1 and the second axis B1 intersect at a predetermined joint angle θ1. In a bisector C1 halving the angle contained between the first axis A1 and the second axis B1, moreover, there are set an x-axis and a y-axis orthogonal to each other, and a z-axis orthogonal to the bisector C1. Moreover, the first axis A1 and the second axis B1 are arranged in the plane containing the x-axis and the z-axis.

Figure 5:
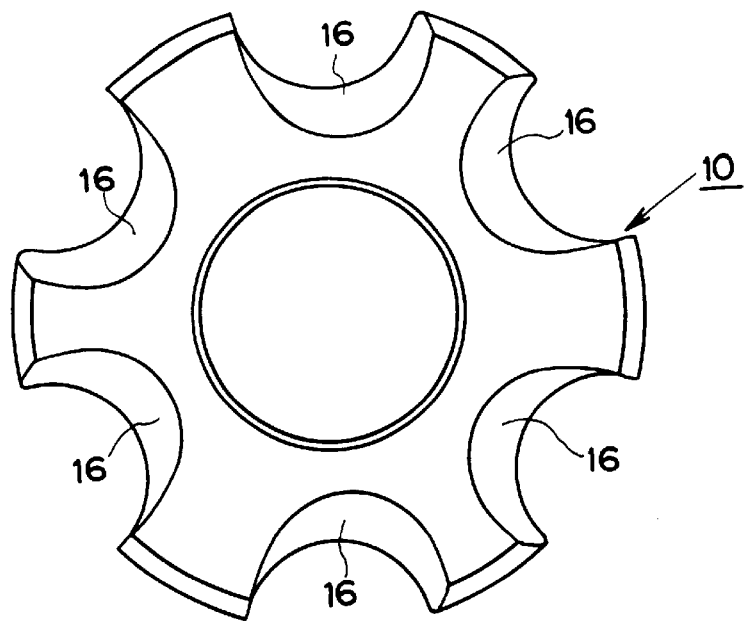
FIG. 5 is a side elevation, as taken from a differential side, of the Birfield type constant velocity universal joint shown in FIG. 2.

FIG. 5 is a side elevation, as taken from the side of the differential 4, of the inner race 10. In the outer circumference of the inner race 10, there are formed six inner grooves 16 which are arranged equidistantly in the circumferential direction. As shown in FIG. 2, the sectional shape of each inner groove 16 in a plane containing the first axis A1 is formed into such an arcuate shape as to project toward the outer circumference of the inner race 10. In the plane containing the first axis A1, moreover, the center D1 of curvature of each inner groove 16 is located (as will be described as "offset") at one of intersections E1 between the bisector C1 and the first axis A1. Here, each inner groove 16 is formed to have a generally semicircular side face shape.

Figure 6:
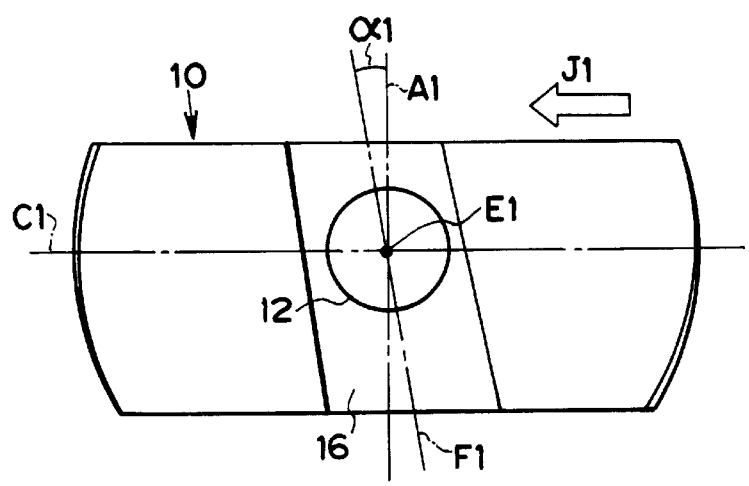
FIG. 6 is a conceptional top plan view showing the inner race of the Birfield type constant velocity universal joint shown in FIG. 2.
Figure 7:
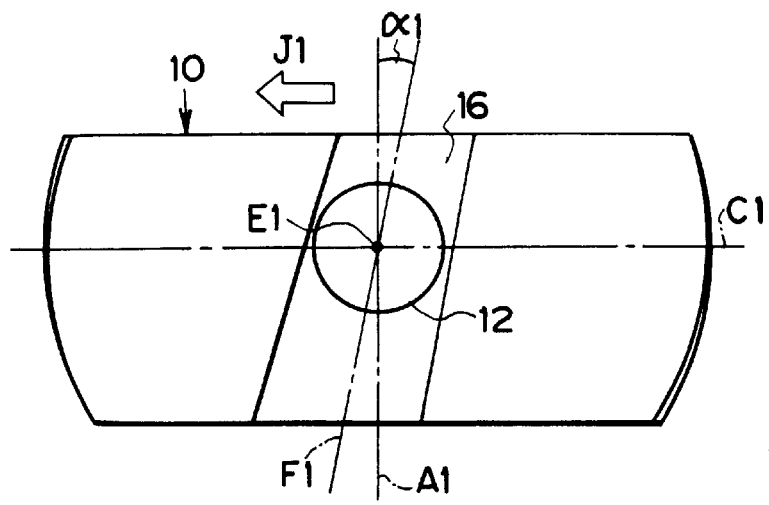
FIG. 7 is a conceptional top plan view showing the inner race of the Birfield type constant velocity universal joint shown in FIG. 2.

FIGS. 6 and 7 are schematic top plan views showing the construction of the inner race 10. FIG. 6 shows the shape of one of the inner grooves 16 of FIG. 5, which are alternately arranged in the circumferential direction. Moreover, the inner groove 16 of FIG. 7 is alternately adjacent to the inner groove 16 of FIG. 6.

The inner groove 16 shown in FIG. 6 is formed such that its longitudinal front portion is helical with respect to the outer circumference of the inner race 10. Specifically, a transverse center line F1 of the inner groove 16 is made linear and inclined at an angle α 1 with respect to the first axis A1. Specifically, the end portion of the inner groove 16 on the side of the differential 4 is positioned in front of the first axis A1 in the rotational direction J1 of the inner race 10, and the end portion of the inner groove 16 on the side of the wheel 6 is positioned at the back of the first axis A1 in the rotational direction J1 of the inner race 10.

On the other hand, the center line F1 of the inner groove 16 shown in FIG. 7 is also inclined at the angle α1 with respect to the first axis A1. Moreover, the direction of inclination of the inner groove 16 of FIG. 7 is reversed from that of the inner groove 16 of FIG. 6. In short, all the adjoining inner grooves 16 are constructed to extend midway between the inner grooves 16 and made symmetric with respect to the (not-shown) plane containing the first axis A1.

In the inner circumference of the outer race 11, on the other hand, there are formed six outer grooves 17 which are arranged equidistantly in the circumferential direction. The sectional shape of each outer groove 17 in a plane containing the second axis B1 is formed into such an arcuate shape as to project toward the outer circumference of the outer race 11. In the plane containing the second axis B1, moreover, the center G1 of curvature of each outer groove 17 is offset at the other of intersections E1 between the bisector C1 and the second axis B1. In short, the curvature center D1 and the curvature center G1 are arranged on the two sides of the intersection E1 between the first axis A1 and the second axis B1. Moreover, the side face of each outer groove 17 is formed into a generally semicircular shape.

Figure 8:
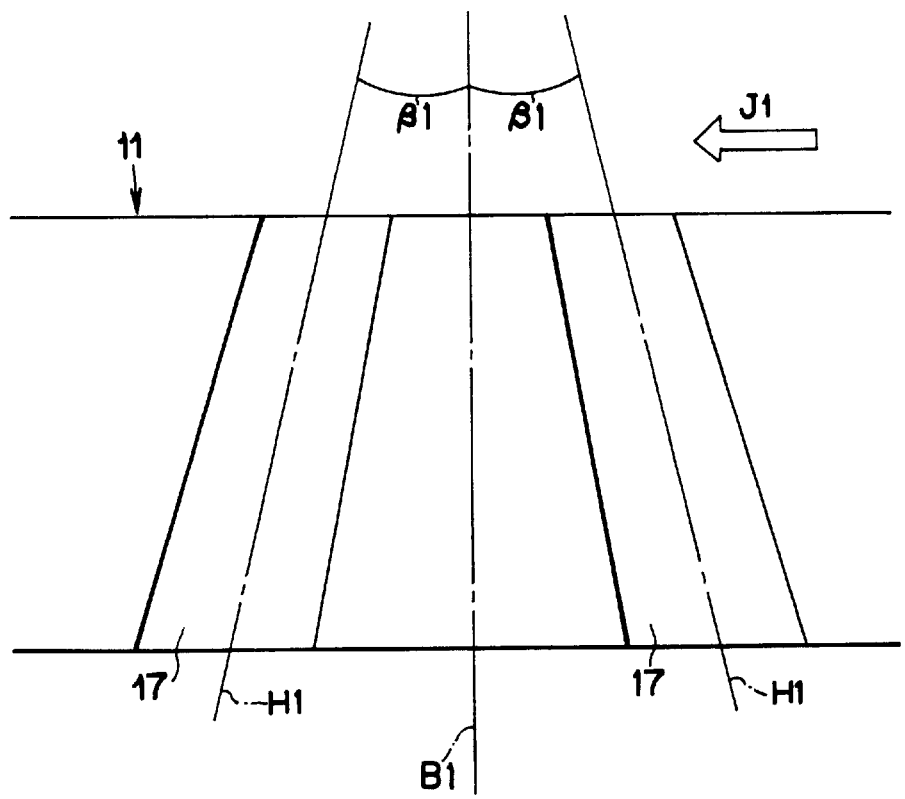
FIG. 8 is a development elevation showing the outer race of the Birfield type constant velocity universal joint shown in FIG. 2.

FIG. 8 is a schematic development elevation showing the outer circumferential shape of the outer race 11. Each outer groove 17 is helically formed in the inner circumference of the outer race 11. Moreover, the adjoining outer grooves 17 are inversely inclined. More specifically, the outer groove 17 for retaining the ball 12 in association with the inner groove 16 shown in FIG. 6 is shown on the lefthand side of FIG. 8.

Moreover, the outer groove 17 for retaining the ball 12 in association with the inner groove 16 shown in FIG. 7 is shown on the righthand side of FIG. 8. Specifically, a transverse center line H1 of each outer groove 17 is inclined at an angle β1 with respect to the second axis B1. More specifically, all the adjoining outer grooves 17 are constructed to extend midway between the outer grooves 17 and made symmetric with respect to the (not-shown) plane containing the second axis B1.

In the retainer 13, there are formed six ball retaining holes 18 which are so arranged equidistantly in the circumferential direction as to extend through the retainer 13 in the thickness direction. Moreover, each ball retaining hole 18 is formed into a generally square shape in a plane normal to the bisector C1. With each ball 12 being arranged in each ball retaining hole 18, each ball 12 is partially arranged in the inner groove 16 and the outer groove 17.

On the other hand, the shaft 8 is arranged in the (not-shown) boot having a bellows shape. Moreover, this boot is fixed at its one end side on the outer circumference of the open side of the outer race 11 and at its other end side on the shaft 8. By this boot, the internal space of the Birfield type constant velocity universal joint 9 is sealed up and is filled up with the (not-shown) grease for lubricating the heating and wearing portions.

The inner race 10 and the outer race 11 are made of a material such as carbon steel or chromium steel. On the other hand, the retainer 13 is made of a material such as chromium steel, and the balls 12 are made of a material such as bearing steel. Moreover, the shaft 8 is made of a material such as carbon steel, carbon steel pipe or boron steel. Still moreover, the materials making these shaft 8, inner race 10, outer race 11, balls 12 and retainer 13 are all thermally treated. Specifically, the medium carbon steel is induction-hardened, and the low carbon steel is carburized. By thus hardening the surfaces of the various materials, the individual parts are made to retain strengths necessary for transmitting the torque.

Here will be described the running operations of the vehicle 1 shown in FIG. 1. The torque, as outputted from the engine 2, is transmitted through the transmission 3 and the differential 4 to the individual front drive shafts 5. More specifically, the torque, as transmitted to the shaft 8, is transmitted through the inner race 10 and the balls 12 to the outer race 11. When the individual front drive shafts 5 rotate in the direction of arrow J1, their torques are transmitted to the wheels 6 so that the vehicle 1 runs, forward in the direction of arrow K1.

The actions of the Birfield type constant velocity universal joint 9 during the aforementioned torque transmissions will be described in detail on the case in which the constant velocity universal joint 9 is arranged on the lefthand side of FIG. 1. When the shaft 8 rotates in the direction of arrow J1, the inner race 10 rotates in the direction of arrow J1, as seen from FIGS. 4, 6 and 7.

In the Birfield type constant velocity universal joint 9, moreover, the curvature center D1 of the inner groove 16 and the curvature center G1 of the outer groove 17 are offset with respect to the intersection E1, and the individual balls 12 are retained by the retainer 13. As a result, the center M1 of each ball 12 revolves round the intersection E1 along a circular locus N1 in the bisector C1, as shown in FIGS. 3 and 4.

As a result, constant speed rotations are achieved between the shaft 8 and the inner race 10, and the outer race 11. During the rotations of the inner race 10 and the outer race 11, moreover, the individual balls 12 revolve round the intersection E1 and move along the inner grooves 16 and the outer grooves 17.

When the torque is to be transmitted from the inner race 10 to the outer race 11, a predetermined load acts on the touch points between each ball 12, and the inner groove 16 and the outer groove 17. Here will be geometrically described the load to act on the touch point between the inner groove 16 and the ball 12.

First of all, the curvature center D1 of the inner groove 16 and the curvature center G1 of the outer groove 17 are offset on the both sides of the intersection E1 so that the touch point between each ball 12 and the inner groove 16 displaces three-dimensionally. On the side of the inner groove 16, the touch point Q1 between the ball 12 and the inner groove 16 is set outside of the bisector C1, as shown in FIG. 4, when the inner race 10 is rotated in the direction of arrow J1. As a result, when the ball 12 revolves along the locus N1, the load to act on the touch point Q1 between each ball 12 and the inner groove 16 fluctuates at all times in the directions of the x-axis, the y-axis and the z-axis.

Here will be described the maximum of the load to arise at the touch point Q1 between each ball 12 and the inner groove 16. This maximum load is determined by the balance between the load P1 at each ball 12 and the product (or moment) of an orthogonal line L2 and a length L1. Here, the orthogonal line L2 means a segment which is set from the intersection E1 at a right angle with respect to the line of action of the load P1, that is, the arm of moment.

In this embodiment, the first axis A1 and the second axis B1 are arranged in the plane containing the x-axis and the z-axis, as shown in FIG. 3. This arrangement maximizes the component in the x-axis direction at the instant when the center M1 of the ball 12 comes to the longitudinal end portion (as located at the upper side of FIG. 6) of the inner groove 16.

When the center M1 of the ball 12 moves to the longitudinal center of the inner groove 16 as the inner race 10 and the outer race 11 rotate, the component in the y-axis direction takes the maximum. When the center M1 of the ball 12 moves to the longitudinal end portion (as located at the lower side of FIG. 6), the component in the x-axis direction takes the minimum.

After this, the moving direction of the ball 12 is reversed as the inner race 10 and the outer race 11 rotate. At the instant when the center M1 of the ball 12 reaches the longitudinal center of the inner groove 16, moreover, the component in the y-axis direction takes the minimum. Still moreover, the component in the x-axis direction takes the maximum at the instant when the center M1 of the ball 12 returns to the longitudinal end portion (as located at the upper side of FIG. 6) of the inner groove 16.

It has been confirmed that the load P1 at the touch point Q1 between the ball 12 and the inner groove 16 takes the maximum at the instant when the ball 12 reaches the longitudinal center of the inner groove 16 during one rotation of the inner race 10 and the outer race 11, that is, at the instant when the y-axis component of the center M1 of the ball 12 takes the maximum, as shown in FIG. 4.

According to this embodiment, moreover, each inner groove 16 is helically formed in the outer circumference of the inner race 10. Still moreover, all the adjoining inner grooves 16 are constructed to extend midway of the mutual inner grooves 16 and made symmetric with respect to the plane containing the first axis A1.

In the inner groove 16 shown in FIG. 6, therefore, the length L1 of the orthogonal line L2 is made as long as possible for the ball 12 which is in the rotational phase of the maximum load P1. Because the moment is constant, moreover, the absolute value of the x-axis component of the vector with respect to the bisector C1 is set as large as possible to make the load P1 at the touch point Q1 as small as possible.

On the side of the outer race 11, as shown in FIG. 8, the touch point between the ball 12 and the outer groove 17 displaces along the center line H1. Moreover, the maximum of the load to act on the touch point between the ball 12 and the outer groove 17 for retaining the ball 12 in association with the inner groove 16, as shown in FIG. 6, is suppressed by the action similar to that on the side of the inner groove 16 shown in FIG. 6.

As a result, the fatigue and separation, as might otherwise occur, is reduced at the touch point Q1 between each ball 12 and the inner groove 16 and at the touch point between each ball 12 and the outer groove 17. This reduction improves the durability and the torque transmitting function of the Birfield type constant velocity universal joint 9. The reduction further suppresses the vibration and the booming noise of the Birfield type constant velocity universal joint 9.

Here, the right and left Birfield type constant velocity universal joints 9 rotate in the opposite directions, as seen separately from the side of the differential 4. If the Birfield type constant velocity universal joints are constructed to have inner grooves and outer grooves individually inclined only in one direction and are individually connected to the right and left drive shafts, therefore, one Birfield type constant velocity universal joint is enabled to have an improved durability by the action similar to the aforementioned one.

In the other Birfield type constant velocity universal joint, however, the rotational direction is reversed so that the aforementioned orthogonal line becomes as short as possible. This may result in the reduction of the durability of the other Birfield type constant velocity universal joint. This problem could be solved by reversing the inclinations of the inner grooves and outer grooves of the Birfield type constant velocity universal joints to be connected to the right and left drive shafts. If this construction is adopted, however, the Birfield type constant velocity universal joints having the different constructions have to be separately connected to the right and left drive shafts. This raises another problem to increase the number of kinds, of parts.

In this embodiment, on the contrary, the adjoining inner grooves 16 are constructed to extend midway between the mutual inner grooves 16 and are made symmetric with respect to the plane containing the first axis A1. Moreover, all the adjoining outer grooves 17 are constructed to extend midway between the mutual outer grooves 17 and are made symmetric with respect to the plane containing the second axis B1.

In the Birfield type constant velocity universal joint 9 arranged on the righthand side of FIG. 1, therefore, operations and actions similar to those of the Birfield type constant velocity universal joint 9, as arranged on the lefthand side of FIG. 1, can be achieved from the inner grooves 16 shown in FIG. 7, the outer grooves 17 corresponding to the inner grooves 16, and the balls 12 retained by the inner grooves 16 and the outer grooves 17.

In short, according to this embodiment, even if the Birfield type constant velocity universal joints 9 of one kind (of the identical structure) are connected to the right and left front drive shafts 5, their individual durabilities and torque transmitting functions are retained substantially identical. As a result, what is required is to connect the Birfield type constant velocity universal joints not of different kinds (of different structures) but of one kind.

Figure 9:
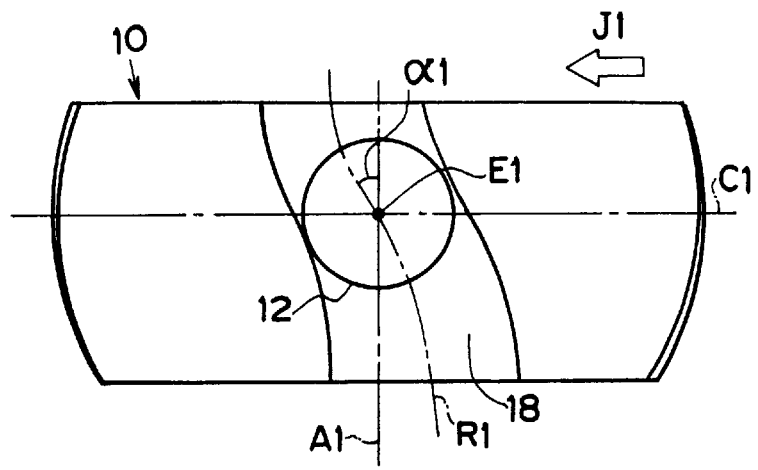
FIG. 9 is a conceptional top plan view showing another example of the construction of the inner race in the invention.
Figure 10:
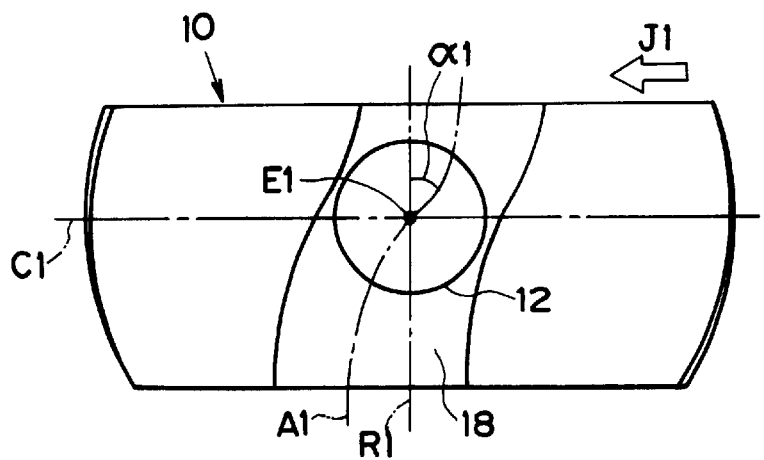
FIG. 10 is a conceptional top plan view showing another example of the construction of the inner race in the invention.

FIGS. 9 and 10 are conceptional top plan views showing another construction example of the inner race 10. In FIGS. 9 and 10, the upper side corresponds to the side of the differential 4, and the lower side corresponds to the side of the wheels 6. Moreover, the components of the inner race 10 of FIGS. 9 and 10 identical to those of the inner race 10 of FIGS. 6 and 7 are designated by the common reference numerals, and their description will be omitted.

An inner groove 18 shown in FIG. 9 is made helical at its longitudinal portion with respect to the inner race 10. Specifically, the center line R1 of the inner groove 18 is set at its longitudinal central portion at an inclination of the angle α1 with respect to the first axis A1. At the two longitudinal ends of the inner groove 18, moreover, the center line R1 and the first axis A1 are set generally in parallel. Still moreover, the end portion of the inner groove 18 on the side of the differential 4 is positioned in front of the first axis A1 in the rotational direction J1 of the inner race 10, and the end portion of the inner groove 18 on the side of the wheel 6 is positioned at the back of the first axis A1 in the rotational direction J1 of the inner race 10.

The inner groove 18 shown in FIG. 10 is also formed into a meandering shape like the inner groove 18 shown in FIG. 9. Moreover, the inner grooves 18 shown in FIG. 9 and the inner grooves 18 shown in FIG. 10 are alternately arranged in the outer circumference of the inner race 10. In short, all the adjoining inner grooves 18 are constructed to extend midway between the mutual inner grooves 18 and are made symmetric with respect to the plane containing the first axis A1.

Figure 11:
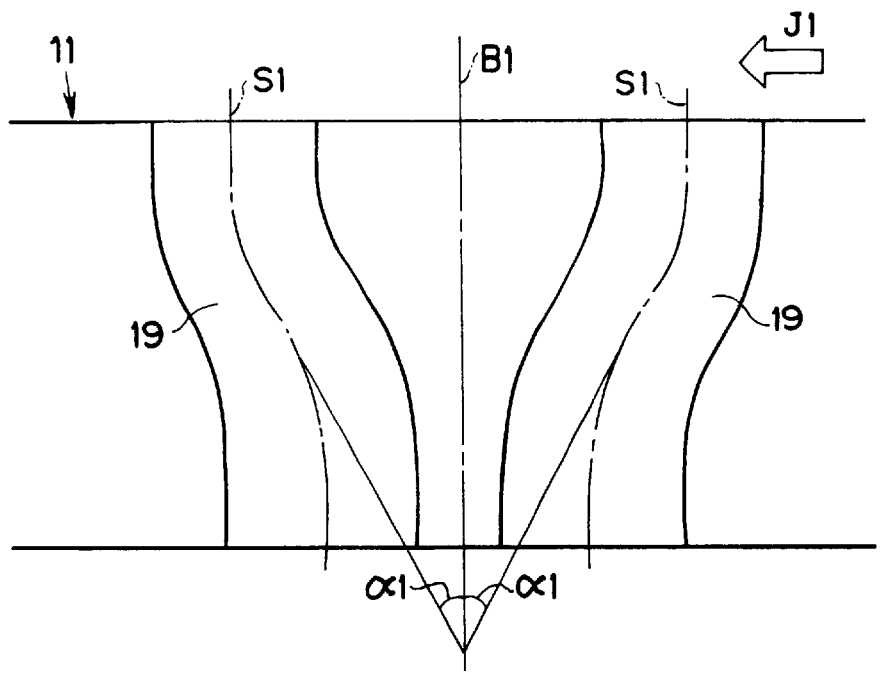
FIG. 11 is a development elevation showing an outer race corresponding to the inner races of FIGS. 9 and 10.

FIG. 11 is a development elevation showing the construction of the outer race 11 corresponding to the inner race 10 of FIGS. 9 and 10. All outer grooves 19, as formed in the outer race 11 shown in FIG. 11 and adjacent to each other, are inclined in opposite directions. Specifically, the outer groove 19 for retaining the ball 12 in association with the inner groove 18 of FIG. 9 is shown on the righthand side of FIG. 11.

On the other hand, the outer groove 19 for retaining the ball 12 in association with the inner groove 18 of FIG. 10 is shown on the lefthand side of FIG. 11. In FIG. 11, moreover, a transverse center line S1 of the lefthand outer groove 19 is inclined at its longitudinal center portion at the angle α1 with respect to the second axis B1. In FIG. 11, the center line S1 and the second axis B1 are set generally in parallel at the both longitudinal ends of the lefthand outer groove 19.

In FIG. 11, moreover, the transverse center line S1 of the righthand outer groove 19 is inclined at its longitudinal center portion at the angle α1 with respect to the second axis B1. At the both longitudinal ends of the righthand outer groove 19, as shown in FIG. 11, the center line S1 and the second axis B1 are set generally in parallel. In FIG. 11, the inclination direction of the lefthand outer groove 19 and the inclination direction of the righthand outer groove 19 are reversed from each other. In short, all the adjoining outer grooves 19 are constructed to extend midway between the mutual outer grooves 19 and are made symmetric with respect to the plane containing the second axis B1.

Even when the inner race 10 and the outer race 11 shown in FIGS. 9 to 11 are used, it is also possible to achieve operations and effects similar to those of the inner race 10 and the outer race 11 of FIGS. 5 to 8. In the inner race 10 of FIGS. 9 and 10, on the other hand, the center line R1 of the inner groove 18 is set at its both longitudinal ends generally in parallel with the first axis A1. In the outer race 11 of FIG. 11, moreover, the center line S1 of the outer groove 19 is set at its both longitudinal ends generally in parallel with the second axis B1.

As a result, the segment L1 of the orthogonal line L2, as shown in FIG. 4, is set longer than that of the case of FIG. 6, when the ball 12 retained by the inner groove 18 of FIG. 9 and the righthand outer groove 19 of FIG. 11 moves to the longitudinal ends of the inner groove 18 and the outer groove 19. As a result, the load at the touch point is further suppressed.

Figure 12:
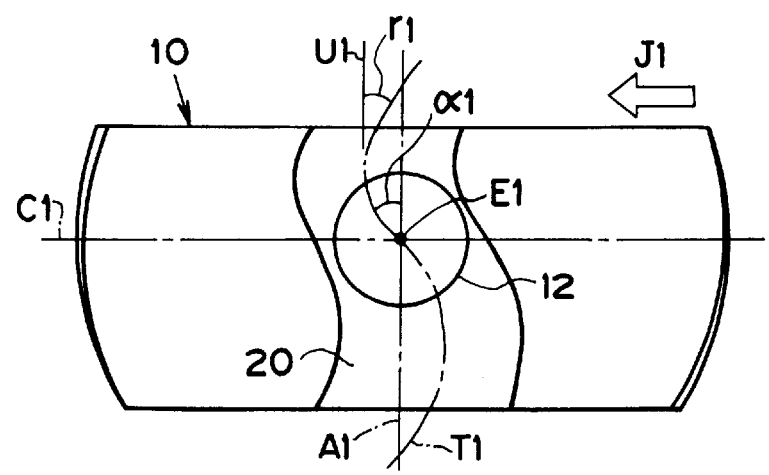
FIG. 12 is a conceptional top plan view showing still another example of the construction of the inner race in the invention.
Figure 13:
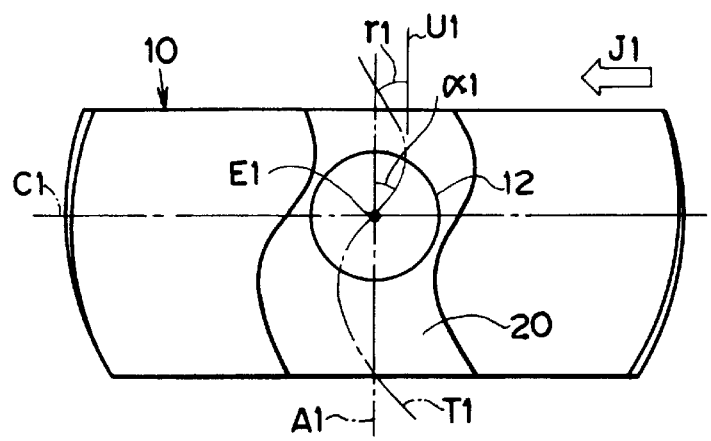
FIG. 13 is a conceptional top plan view showing still another example of the construction of the inner race in the invention.

FIGS. 12 and 13 are conceptional top plan views showing another example of the construction of the inner race 10. In FIGS. 12 and 13, the upper side corresponds to the side of the differential 4, and the lower side corresponds to the side of the wheel 6. Moreover, the components of the inner race 10 of FIGS. 12 and 13 identical to those of the inner race 10 of FIGS. 6 and 7 are designated by the common reference numerals, and their description will be omitted.

An inner groove 20 shown in FIG. 12 is made helical in its longitudinal entirety with respect to the inner race 10. Specifically, the center line T1 of the inner groove 20 is inclined at its longitudinal center portion at the angle α1 with respect to the first axis A1. At the both longitudinal ends of the inner groove 20, moreover, the center line T1 is inclined at an angle γ1 with respect to a segment U1 parallel to the first axis A1. Here, the inclination direction of the center portion of the inner groove 20 with respect to the first axis A1 is reversed from the inclination direction of the both end portions of the inner groove 20 with respect to the first axis A1.

Moreover, the end portion of the inner groove 20 on the side of the differential 4 is positioned in front of the first axis A1 in the rotational direction J1 of the inner race 10, and the end portion of the inner groove 20 on the side of the wheel 6 is positioned at the back of the first axis A1 in the rotational direction J1 of the inner race 10. In short, the inner groove 20 is meandered in its entirety.

The inner groove 20 shown in FIG. 13 is also meandered like the inner groove 20 shown in FIG. 12. The inclination direction of the inner groove 20 shown in FIG. 13 is reversed from that of the inner groove 20 shown in FIG. 12. Moreover, the inner groove 20 of FIG. 12 and the inner groove 20 of FIG. 13 are alternately arranged in the outer circumference of the inner race 10. Specifically, all the adjoining inner grooves 20 are constructed to extend midway between the mutual inner grooves 20 and are made symmetric with respect to the plane containing the first axis A1.

Figure 14:
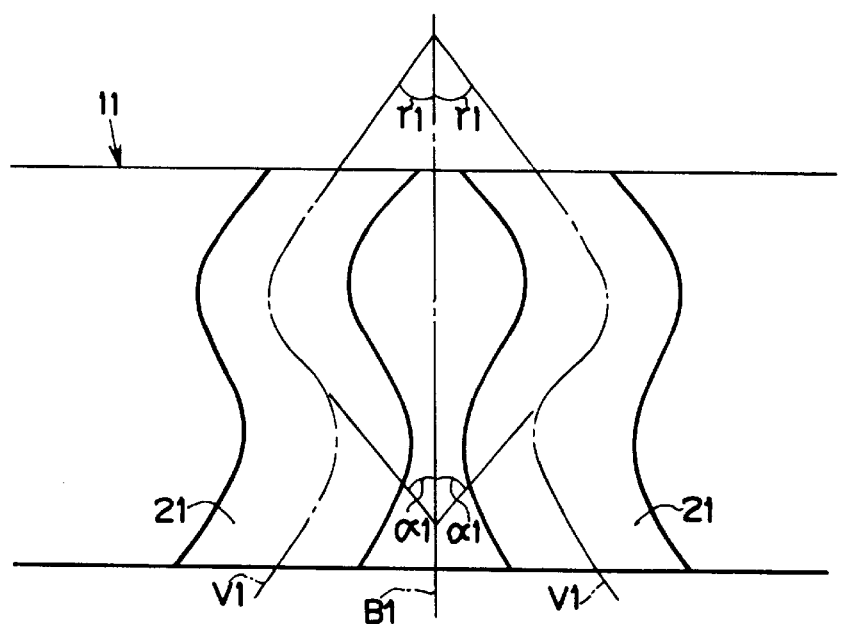
FIG. 14 is a development elevation showing an outer race corresponding to the inner races of FIGS. 12 and 13.

FIG. 14 is a development elevation showing a construction of the outer race 11 corresponding to the inner race 10 of FIGS. 12 and 13. All outer grooves 21, as are formed in the outer circumference of the outer race 11 shown in FIG. 14 and adjacent to each other, are inclined in opposite directions. Specifically, the outer groove 21 for retaining the ball 12 in association with the inner groove 20 of FIG. 12 is shown on the righthand side of FIG. 14.

On the other hand, the outer groove 21 for retaining the ball 12 in association with the inner groove 20 of FIG. 13 is shown on the lefthand side of FIG. 14. A transverse center line V1 of the outer groove 21 is inclined at its longitudinal center line at the angle α1 with respect to the second axis B1. Moreover, the center line V1 of each outer groove 21 is inclined at its both longitudinal ends at the angle γ1 with respect to the first axis A1. In short, the inclination direction of the outer groove 21, as shown on the lefthand side of FIG. 14, and the inclination direction of the outer groove 21, as shown on the righthand side of FIG. 14, are reversed from each other. In other words, all the adjoining outer grooves 21 are constructed to extend midway between the mutual outer grooves 21 and are made symmetric with respect to the plane containing the second axis B1.

Even when the inner race 10 and the outer race 11 shown in FIGS. 12 to 14 are used, it is also possible to achieve operations and effects similar to those of the inner race 10 and the outer race 11 of FIGS. 5 to 8. In the inner race 10 of FIGS. 12 and 13, on the other hand, the center line T1 of the inner groove 20 is inclined at its both longitudinal ends at the angle γ1 with respect to the first axis A1. In the outer race 11 of FIG. 14, moreover, the center line V1 of the outer groove 21 is inclined at its both longitudinal ends at the angle γ1 with respect to the second axis B1.

As a result, the segment L1 of the orthogonal line L2, as shown in FIG. 4, is set longer than that of the case of FIG. 10, when the ball 12 retained by the inner groove 20 of FIG. 12 and the righthand outer groove 21 of FIG. 14 moves to the longitudinal ends of the inner groove 20 and the outer groove 21. As aresult, the load at the touch point is further suppressed.

Here, although not shown, at least one pair of the adjoining inner grooves could be constructed to extend midway between the mutual inner grooves, and at least one pair of adjoining outer grooves could be constructed to extend midway between the mutual outer grooves. On the other hand, the shape and the inclination angle of the inner grooves of the inner race, and the shape and the inclination angle of the outer grooves of the outer race are set on the basis of the sizes and dimensions of the individual portions of the Birfield type constant velocity universal joint 9.

Figure 15:
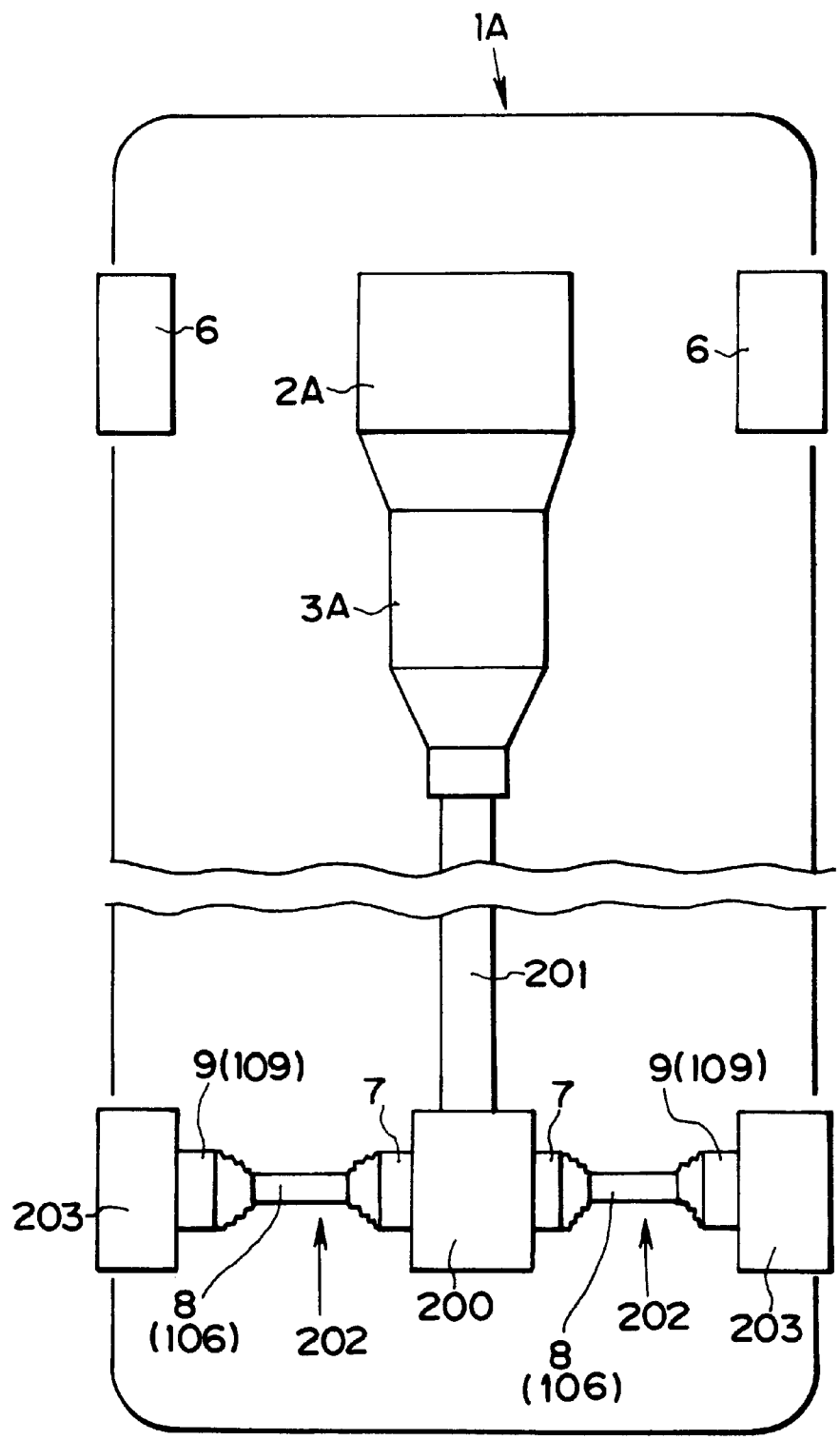
FIG. 15 is a top plan view showing a mounting position of the Birfield type constant velocity universal joint of the invention.

FIG. 15 is a top plan view showing another mode of use of the Birfield type constant velocity universal joint 9. In a vehicle 1A shown in FIG. 15, an engine 2A is mounted on the front portion of the vehicle, and a transmission 3A is connected to the output side of the engine 2A. Moreover, a differential 200 is mounted on the rear portion of the vehicle 1A, and the transmission 3A and the differential 200 are connected through a propeller shaft 201. Rear wheels 203 are connected through rear drive shafts 202 to the differential 200. In short, the vehicle 1A is the so-called "FR (front engine/rear drive)" vehicle. Here, the remaining construction of the vehicle 1A is similar to that of the vehicle 1. Moreover, the aforementioned Birfield type constant velocity universal joint 9 could be used as a component of the rear drive shafts 202. The Birfield type constant velocity universal joint 9 could also be applied to the joint between the propeller shaft 201 and the transmission 3A. In this case, the Birfield type constant velocity universal joint 9 is arranged at the joint between the shaft 8 and the rear wheel 203.

Figure 16:
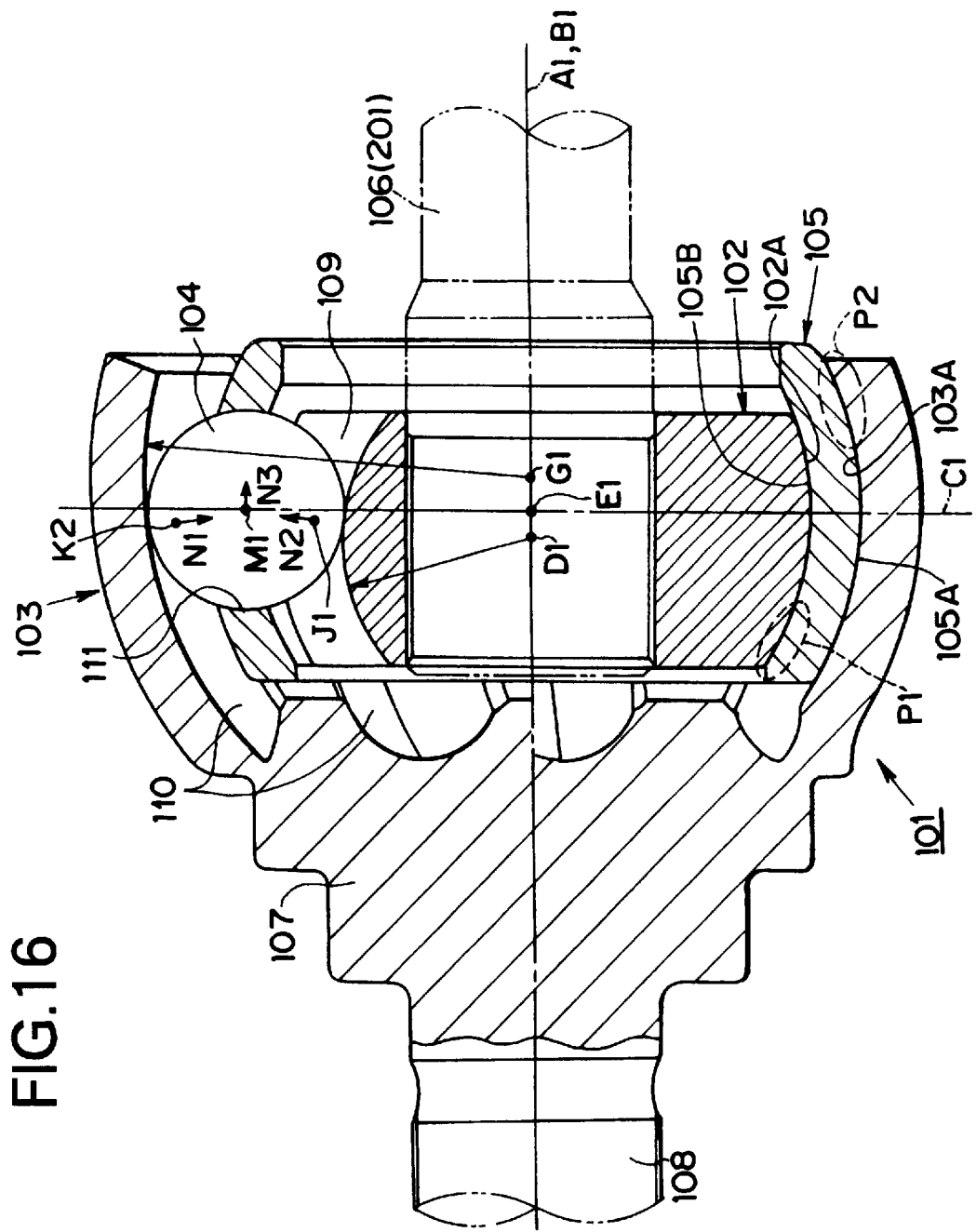
FIG. 16 is a section showing a Birfield type constant velocity universal joint according to another embodiment of the invention.

FIG. 16 is a section showing a Birfield type constant velocity universal joint 101 according to another embodiment of the invention. Here will be described the case in which the Birfield type constant velocity universal joint 101 is applied to the joint between the transmission 3a and the propeller shaft 201, as shown in FIG. 15. The Birfield type constant velocity universal joint 101 is equipped with an inner race 102, an outer race 103, six balls 104 and an annular retainer 105. Here will be specifically described the constructions of those parts and their positional relations to other parts.

The inner race 102 is splined to one end side of a shaft 106 and is positioned in the longitudinal direction of the shaft 106 by the (not-shown) snap ring. With this construction, the inner race 102 can rotate on the first axis A1. Here, the shaft 106 is formed at the front end portion of the propeller shaft 201.

At the end portion of the outer race 103 on the side opposed to the shaft 106, there is formed a boss 107 integrally with the outer race 103, and this boss 107 is equipped at its outer end with a shaft 108. This shaft 108 is connected to the transmission 3A. With this construction, the outer race 103 can rotate on the second axis B1.

When the propeller shaft 201 having the Birfield type constant velocity universal joint 101 of the aforementioned construction is mounted on the vehicle, the first axis A1 and the second axis B1 are set with a predetermined angle of connection. In FIG. 16, however, the first axis A1 and the second axis B1 are generally aligned for conveniences.

Figure 17:
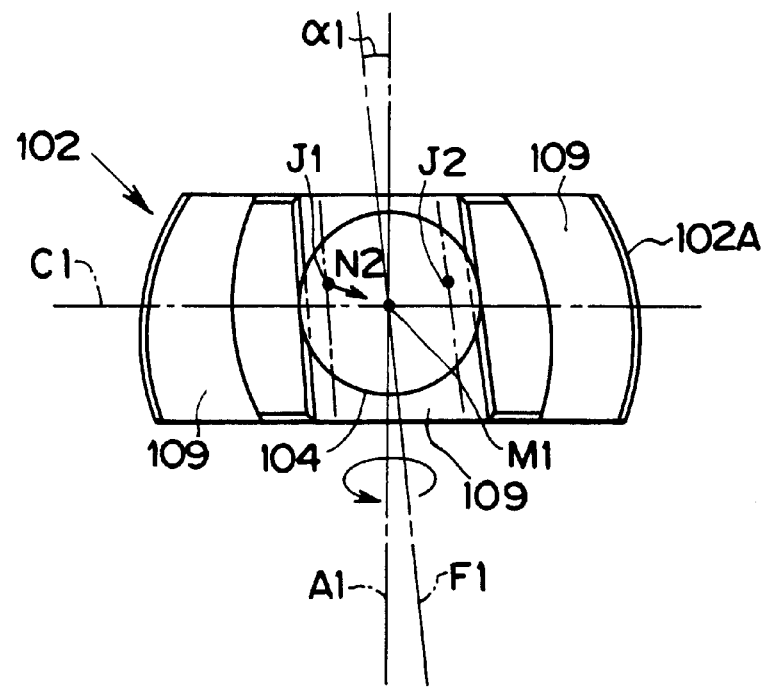
FIG. 17 is a top plan view showing an inner race to be used in the Birfield type constant velocity universal joint shown in FIG. 16.
Figure 18:
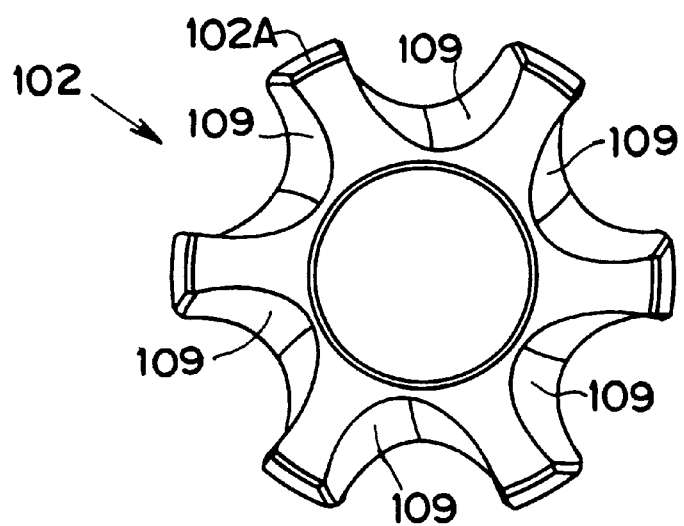
FIG. 18 is a side elevation of the inner race shown in FIG. 17.

FIG. 17 is a top plan view of the inner race 102, and FIG. 18 is a side elevation of the inner race 102. In the outer circumference of the inner race 102, there are formed six inner grooves 109 which are arranged equidistantly in the circumferential direction. As shown in FIG. 17, the sectional shape of each inner groove 109 in a plane containing the first axis A1 is formed into such an arcuate shape as to project toward the outer circumference of the inner race 102. In the plane containing the first axis A1, moreover, the center D1 of curvature of the arcuate shape portion of each inner groove 109 is offset at one of intersections E1 between the bisector C1 and the first axis A1. Here, each inner groove 109 is formed to have a generally semicircular side face shape.

Moreover, all the inner grooves 109 are formed at their longitudinal entireties helically with respect to the outer circumference of the inner race 102. Specifically, the transverse center line F1 of each inner groove 109 is made linear and inclined at the angle α1 with respect to the first axis A1. The angle of inclination of each inner groove 109 will be hereinafter.

In the inner circumference of the outer race 103, on the other hand, there are formed six outer grooves 110 which are arranged equidistantly in the circumferential direction. The sectional shape of each outer groove 110 in a plane containing the second axis B1 is formed into such an arcuate shape as to project toward the outer circumference of the outer race 103. In the plane containing the second axis B1, moreover, the center G1 of curvature of the arcuate shape portion of each outer groove 110 is offset at the other of intersections E1 between the bisector C1 and the second axis B1. In short, the curvature center D1 and the curvature center G1 are arranged on the both sides of the intersection E1 between the first axis A1 and the second axis B1. Moreover, the side fare of each outer groove 110 is formed into a generally semicircular shape.

Figure 19:
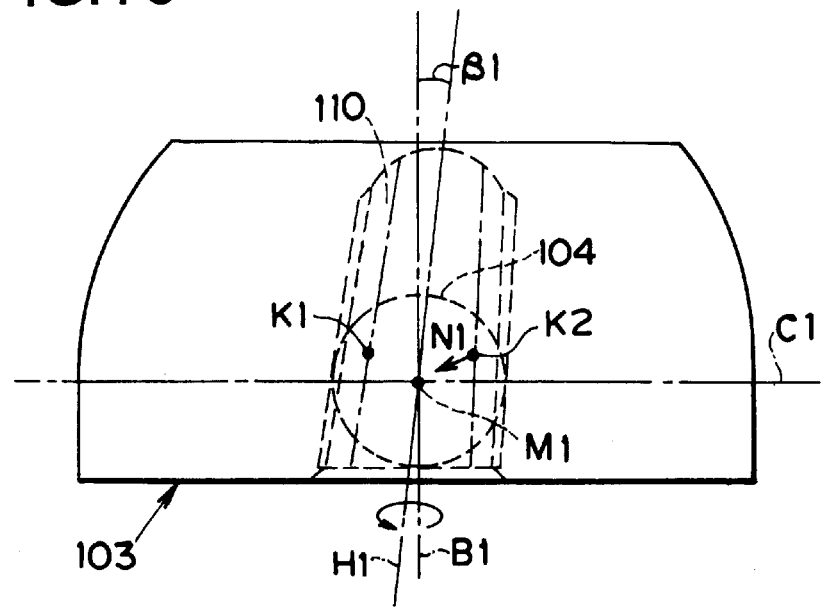
FIG. 19 is a top plan view showing an outer race to be used in the Birfield type constant velocity universal joint shown in FIG. 16.
Figure 20:
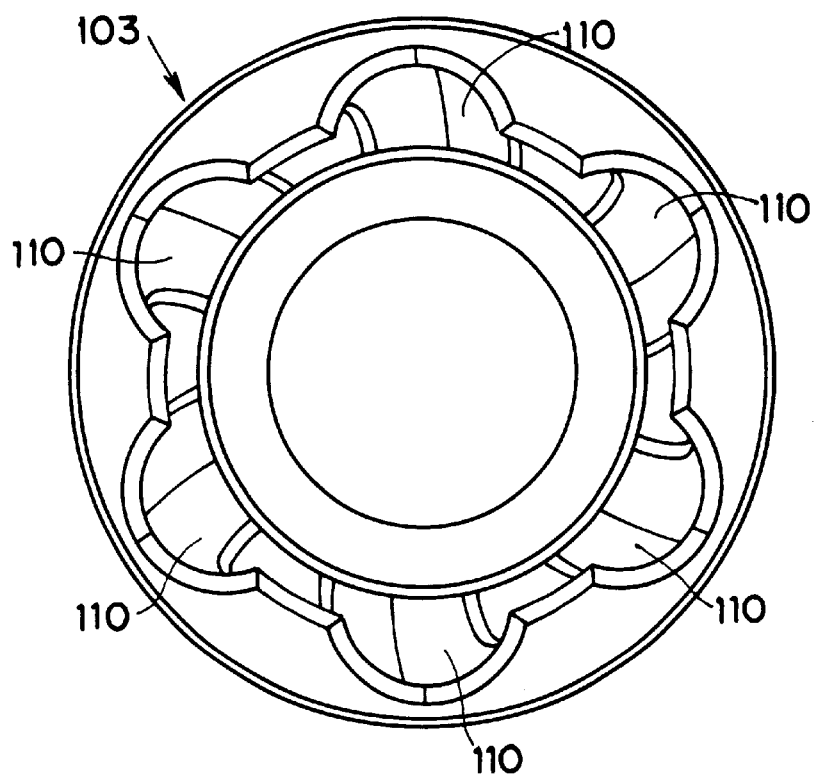
FIG. 20 is a side elevation showing the outer race shown in FIG. 19.

FIG. 19 is a conceptional top plan view showing the construction of the outer race 103, and FIG. 20 is a side elevation of the outer race 103, as taken from its open end side. All the outer grooves 110 are helically formed at their longitudinal entireties in the inner circumference of the outer race 103. Specifically, the transverse center line H1 of each outer groove 110 is inclined at the angle β1 with respect to the second axis B1. The inclination direction of each outer groove 110 and the inclination direction of each inner groove 109 are reversed from each other. The inclination angle of each outer groove 110 will be described hereinafter.

The outer circumferential shape of the aforementioned retainer 105 is curved, as shown in FIG. 16, to project radially outward in the plane containing its (not-shown) center axis. In other words, the shape of the outer spherical surface (or outer circumference) of the retainer 105 resembles the inner spherical surface 103A of the outer race 103. In the assembled state of the Birfield type constant velocity universal joint 101, moreover, the outer spherical surface 105A and the inner spherical surface 103A are in close contact with each other. On the other hand, the inner spherical surface (or inner circumference) 105B of the retainer 105 is curved to project radially outward in the plane containing its center axis. In other words, the inner spherical surface 105B of the retainer 105 has a shape resembling that of the outer spherical surface 102A of the inner race 102. In the assembled state of the Birfield type constant velocity universal joint 101, moreover, the inner spherical surface 105B and the outer spherical surface 102A are in close contact with each other.

In the retainer 105, moreover, there are formed six ball retaining holes 111 which are arranged equidistantly in the circumferential direction and extended through the retainer 105 in the thickness direction. Here, each ball retaining hole 111 is formed into a general square in the plane perpendicular to the bisector C1. Each ball 104 is arranged in each ball retaining hole 111 so that it is retained in each pair of each inner groove 109 and each outer groove 110.

When the torque is transmitted through the balls 104 between the outer race 103 and the inner race 102, moreover, the touch points between the balls 104 and the inner surface of the inner groove 109 displace three-dimensionally as the balls 104 move in the inner grooves 109 and the outer grooves 110 in their longitudinal directions. The touch point moves along the locus, as indicated by single-dotted lines in FIG. 17, for example. In this embodiment, moreover, the curvature center D1 and the curvature center G1 are offset on the both sides of the bisector C1. As a result, first touch points J1 and J2 between the inner surface of the inner groove 109 and the balls 104 are set at positions offset from the bisector C1, when the balls 104 are located at predetermined positions in the longitudinal direction of the inner groove 109.

On the other hand, the touch points between the balls 104 and the inner surface of the outer groove 110 also displace three-dimensionally so that they move along the locus, as indicated by single-dotted lines in FIG. 19, for example. In this embodiment, the curvature center D1 and the curvature center G1 are offset on the both sides of the bisector C1. As a result, second touch points K1 and K2 between the inner surface of the outer groove 110 and the balls 104 are set at positions offset from the bisector C1 when the balls 104 are located at predetermined positions in the longitudinal direction of the outer groove 110.

Here will be described the direction to incline the outer groove 110 and the inner groove 109. The Birfield type constant velocity universal joint 101 is connected at its outer race 103 to the transmission and at its inner race 102 to the differential. As a result, the torque of the outer race 103 is transmitted through the balls 104 to the inner race 102 when the outer race 103 rotates in the direction, as indicated by arrow in FIG. 19. At this torque transmitting time, a load N1, as directed from the inner surface of the outer groove 110 to the center M1 of the ball 104, acts at the second touch point K2. On the other hand, a load (or reaction) N2, as directed from the inner surface of the inner groove 109 to the center M1 of the ball 104, acts at the first touch point J1.

In this embodiment, moreover, the second center line H1 is inclined at the angle β1 with respect to the second axis B1 in a direction for the second touch point K2 to approach the bisector C1 from the state in which the second center line H1 and the second axis B1 are aligned. In other words, the second center line H1 is is inclined in such a direction that the acute angle made between the vector of the load N1 and the bisector C1 may decrease. In short, the outer groove 110 is given the three-dimensional shape by setting it at a predetermined depth, by curving it in the plane containing the second axis B1 and by inclining it in a predetermined direction.

In this embodiment, still moreover, the first center line F1 is inclined at the angle α1 with respect to the first axis A1 in such a direction that the first touch point J1 may approach the bisector C1 from the state in which the first center line F1 and the first axis A1 are aligned. In other words, the first center line F1 is inclined in such a direction that the acute angle made between the vector of the load N2 and the bisector C1 may decrease. In short, the inner groove 109 is given the three-dimensional shape by setting it at a predetermined depth, by curving it in the plane containing the first axis A1 and by inclining it in a predetermined direction. Thus, the inner groove 109 and the outer groove 110 are inclined in the directions reversed from each other.

In the opening of the outer race 103, on the other hand, there is fixed one end side of the (not-shown) boot having a bellows shape, the other end side of which is fixed on the shaft 106. By this boot, the internal space of the Birfield type constant velocity universal joint 101 is sealed up and is filled up with the (not-shown) grease.

The inner race 102 and the outer race 103 are made of a material such as carbon steel or chromium steel. On the other hand, the retainer 105 is made of a material such as chromium steel, and the balls 104 are made of a material such as bearing steel. Moreover, the shaft 106 is made of a material such as carbon steel, carbon steel pipe or boron steel. Still moreover, the materials making these shaft 106, inner race 102, outer race 103, balls 104 and retainer 105 are all thermally treated. Specifically, the medium carbon steel is induction-hardened, and the low carbon steel is carburized. By thus hardening the surfaces of the various materials, the individual parts are made to retain strengths necessary for transmitting the torque.

Here will be described the operations to transmit the torque by the Birfield type constant velocity universal joint 101 shown in FIG. 16. With the propeller shaft 201 having the Birfield type constant velocity universal joint 101 being mounted on the vehicle, a predetermined connection angle is set between the first axis A1 and the second axis B1.

Moreover, the torque, as outputted from the transmission 3A, is transmitted to the Birfield type constant velocity universal joint 101 of the propeller shaft 201 and then to the differential 200. Thus, the propeller shaft 201 rotates at a high speed, and the torque, as transmitted to the outer race 103, is transmitted through the balls 104 to the inner race 102.

In the Birfield type constant velocity universal joint 101, moreover, the curvature center D1 of the inner groove 109 and the curvature center G1 of the outer groove 110 are offset with respect to the intersection E1, and each ball 104 is retained by the retainer 105. This causes the center M1 of each ball 104 to move on the circular locus along the bisector C1. As a result, the constant speed rotations are retained between the outer race 103 and the inner race 102.

Here in accordance with the changes in the rotational phases of the outer race 103 and the inner race 102, the retainer 105 turns round the intersection E1 with respect to the outer race 103 and the inner race 102. As a result, sliding motions occur between the inner spherical surface 103A of the outer race 103 and the outer spherical surface 105A of the retainer 105 and between outer spherical surface 102A of the inner race 102 and the inner spherical surface 105B of the retainer 105. These sliding portions (or heating portions) and the remaining portions are cooled and lubricated with the grease.

During the rotations of the outer race 103 and the inner race 102, each ball 104 moves in each inner groove 109 and each outer groove 110 in their longitudinal directions. Here in the Birfield type constant velocity universal joint 101, the curvature center D1 of the arcuate portion of the inner groove 109 and the curvature center G1 of the arcuate portion of the outer groove 110 are offset on the both sides of the bisector C1 so that the first touch point J1 between the ball 104 and the inner surface of the inner groove 109 and the second touch point K2 between the ball 104 and the outer groove 110 are offset from the bisector C1.

As a result, the load N1 toward the center M1 of each ball 104 acts at the second touch point K2 between the ball 104 and the inner surface of the outer groove 110 when the torque is transmitted from the outer race 103 through the ball 104 to the inner race 102. Moreover, the load N2 toward the center M1 of each ball 104 acts at the first touch point J1 between the ball 104 and the inner surface of the inner groove 109.

In this embodiment, the inner groove 109 is so inclined that the first touch point J1 approaches the second bisector C1, and the outer groove 110 is so inclined that the second touch point K2 approaches the bisector C1. At the first touch point J1 and the second touch point K2, therefore, the acute one of the angles between the vectors of the two loads N1 and N2 toward the center M1 of the ball 104 and the bisector C1 is made as small as possible. This decreases the resultant force N3 of the two loads N1 and N2, i.e., the pushing force for pushing the retainer 105 in the direction perpendicular to the bisector C1.

Thus, the frictional forces (or the workloads) at the touch portion P1 between the inner spherical surface 105B of the retainer 105 and the outer spherical surface 102A of the inner race 102 and at the touch portion P2 between the outer spherical surface 105A of the retainer 105 and the inner spherical surface 103A of the outer race 103 are reduced to suppress the heat generations at the touch portions P1 and P2. Asia result, the fatigue, wear or separation is hardly caused at the touch portions P1 and P2 to improve the durability and tort transmitting function of the Birfield type constant velocity universal joint 101.

Here, it has been confirmed by our tests that the workload of the Birfield type constant velocity universal joint 101 of the embodiment was reduced to about two thirds as high as that of the Birfield type constant velocity universal joint for the comparison in which the outer groove and the inner groove were not inclined.

Since the heat generations at the touch portions P1 and P2 are suppressed, on the other hand, a necessary torque can be transmitted even when the parts such as the inner race 102, the outer race 103 and the retainer 105 are small-sized (in the external diameters, for example). As a result, the size and weight of the Birfield type constant velocity universal joint 101 itself can be reduced, and the clearance from the parts to be arranged therearound can also be reduced to improve the vehicle mountability.

Since the heat generations at the touch portions P1 and P2 are suppressed, moreover, it is possible to widen the range for selecting the constituents of the grease and materials of the boot which is confined in the Birfield type constant velocity universal joint 101. It is further possible to make as large as possible the connection angle between the outer race 103 and the inner race 102 since heat generation is suppressed at the touch points P1 and P2. This makes it possible to apply the Birfield type constant velocity universal joint 101 to the vehicle or mounting portion which has to make the connection angle between the outer race 103 and the inner race 102 larger than a predetermined value thereby to widen the application range to promote the mass production.

Here, the Birfield type constant velocity universal joint 101, as shown in FIG. 16, could adopt a construction in which the outer groove is inclined at its longitudinal portion in a helical direction whereas the inner groove is inclined at its longitudinal portion in a helical direction. The Birfield type constant velocity universal joint 101 of FIG. 16 could also adopt a construction in which five or less inner grooves and outer grooves of six inner grooves and outer grooves are inclined in the helical direction.

Moreover, the Birfield type constant velocity universal joint 101 shown in FIG. 16 could be applied to a constant velocity universal joint having the construction of the so-called "undercut free type constant velocity universal joint". In this undercut free type constant velocity universal joint, an arcuate portion is formed in a portion of the inner groove in a plane containing the first axis, and the portion of the inner groove other than the arcuate portion is arranged in parallel with the first axis. Moreover, an arcuate portion is formed in a portion of the outer groove in a plane containing the second axis, and the portion of the outer groove other than the arcuate portion is arranged in parallel with the second axis.

Moreover, the Birfield type constant velocity universal joint 101, as shown in FIG. 16, could also be applied to a propeller shaft having the construction, in which the inner race is connected to the transmission whereas the outer race is connected with the differential. In this modification, the inclination direction of the inner groove of the inner race and the inclination direction of the outer groove of the outer race are reversed from those of the shown embodiment. Still moreover, the Birfield type constant velocity universal joint 101 of FIG. 16 could be further applied to the rear drive shaft 202 of the FR vehicle shown in FIG. 15. In this modification, the shaft 106 is connected to the differential 200, and the shaft 108 is connected to the rear wheel 203. In addition, the Birfield type constant velocity universal joint 101 of FIG. 16 could be further applied to the front drive shaft 5 of the FF vehicle shown in FIG. 1. In this modification, the shaft 106 is connected to the differential 4, and the shaft 108 is connected to the front wheel 6.

What is claimed is:

1. A constant velocity universal joint which has: an inner race having a plurality of inner grooves formed in its outer circumference; an outer race arranged on the outer side of said inner race and having a plurality of outer grooves formed in its inner circumference; a plurality of balls arranged for each of pairs composed of one of said inner grooves and one of said outer grooves, and an annular retainer arranged between said inner race and said outer race for retaining the center of said balls in a bisector halving the angle which is made between a first axis of said inner race and a second axis of said outer race, comprising:

at least one portion of said plurality of inner grooves formed helically in the outer circumference of said inner race;
   at least one portion of said plurality of outer grooves formed helically in the inner circumference of said outer race;
   at least one pair of the inner grooves adjoining each other, constructed to extend midway between the pair of the inner grooves and made symmetric, with respect to the plane containing said first axis; and
   at least one pair of the outer grooves adjoining each other, constructed to extend midway between the pair of the outer grooves and made symmetric with respect to the plane containing said second axis,
   wherein the center of curvature of said inner grooves in a plane containing said first axis and the center of curvature of said outer grooves in a plane containing said second axis are provided on both sides of said bisector.

2. A constant velocity universal joint according to claim 1,
   wherein the direction of inclination of the longitudinal center portions of said plurality of inner grooves with respect to said first axis is made different from the direction of inclination of the both longitudinal end portions of said plurality of inner grooves with respect to said first axis, and
   wherein the direction of inclination of the longitudinal center portions of said plurality of outer grooves with respect to said second axis is made different from the direction of inclination of the both longitudinal end portions of said plurality of outer grooves with respect to said second axis.

3. A constant velocity universal joint according to claim 1,
   wherein the direction of inclination of the longitudinal center portions of said plurality of inner grooves with respect to said first axis is made different from the direction of inclination of the both longitudinal end portions of said plurality of inner grooves with respect to said first axis,
   wherein the directions of inclination of the both longitudinal end portions of said plurality of inner grooves with respect to said first axis are identical,
   wherein the direction of inclination of the longitudinal center portions of said plurality of outer grooves with respect to said second axis is made different from the direction of inclination of the both longitudinal end portions of said plurality of outer grooves with respect to said second axis, and
   wherein the directions of inclination of the both longitudinal end portions of said plurality of outer grooves with respect to said second axis are identical.

4. A constant velocity universal joint according to claim 1,
wherein said inner race, said outer race, said balls and said retainer are arranged at a joint portion between a drive shaft, which is arranged between the differential and the wheel of a vehicle, and said wheel.

5. A constant velocity universal joint according to claim 1,
wherein said inner race, said outer race, said balls and said retainer are arranged at the joint portion between a propeller shaft, which is arranged between the transmission and the differential of a vehicle, and said transmission.

6. A constant velocity universal joint according to claim 1,
wherein said inner race, said outer race, said balls and said retainer are arranged at the joint portion between a propeller shaft, which is arranged between the transmission and the differential of a vehicle, and said differential.

7. A constant velocity universal joint according to claim 1,
wherein said inner race, said outer race, said balls and said retainer are arranged at the joint portion between a front drive shaft, which is arranged between the differential and the front wheel of an front engine/front drive vehicle, and said front wheel.

8. A constant velocity universal joint according to claim 1,
wherein said inner race, said outer race, said balls and said retainer are arranged at the joint portion between a rear drive shaft, which is arranged between the differential and the rear wheel of a front engine/rear drive vehicle, and said rear wheel.

9. A constant velocity universal joint which has: an inner race having a plurality of inner grooves formed in its outer circumference; an outer race arranged on the outer side of said inner race and having a plurality of outer grooves formed in its inner circumference; a plurality of balls arranged for each of pairs composed of one of said inner grooves and one of said outer grooves; and an annular retainer arranged between said inner race and said outer race for retaining the center of said balls in a bisector halving the angle which is made between a first axis of said inner race and a second axis of said outer race, comprising:

at least one portion of the arcuate portions of said inner grooves being so helically inclined that the first touch points may approach said bisector; and at least one portion of the arcuate portions of said outer grooves being so helically inclined that the second touch points may approach said bisector, wherein the center of curvature of arcuate portions of said inner grooves in a plane containing said first axis and the center of curvature of arcuate portions of said outer grooves in a plane containing said second axis are provided on both sides of said bisector, so that first touch points, at which said balls and the arcuate portions of said inner grooves abut, and second touch points, at which said balls and the arcuate portions of said outer grooves abut, are set at one of said bisectors.

10. A constant velocity universal joint according to claim 9,
wherein said inner race, said outer race, said balls and said retainer are arranged at the joint portion between a propeller shaft, which is arranged between the transmission and the differential of a vehicle, and said transmission.

11. A constant velocity universal joint according to claim 9,
wherein said inner race, said outer race, said balls and said retainer are arranged at the joint portion between a propeller shaft, which is arranged between the transmission and the differential of a vehicle, and said differential.

12. A constant velocity universal joint according to claim 9,
wherein said inner race, said outer race, said balls and said retainer are arranged at the joint portion between a front drive shaft, which is arranged between the differential and the front wheel of an front engine/front drive vehicle, and said front wheel.

13. A constant velocity universal joint according to claim 9,
wherein said inner race, said outer race, said balls and said retainer are arranged at the joint portion between a rear drive shaft, which is arranged between the differential and the rear wheel of a front engine/rear drive vehicle, and said rear wheel.

* * * * *